United States Patent [19]

Van Der Lely et al.

[11] 4,279,138
[45] Jul. 21, 1981

[54] VEHICLE WITH A LIFTING DEVICE RESPONSIVE TO GROUND IRREGULARITIES

[75] Inventors: Cornelis Van Der Lely, Zug; Cornelis J. G. Bom, Rozenburg, both of Netherlands

[73] Assignee: C. Van Der Lely N. V., Maasland, Netherlands

[21] Appl. No.: 30,377

[22] Filed: Apr. 16, 1979

[30] Foreign Application Priority Data

Apr. 20, 1978 [NL] Netherlands .................. 7804194

[51] Int. Cl.³ .................................... A01B 63/114
[52] U.S. Cl. ............................................... 172/4
[58] Field of Search .............. 172/2, 4, 4.5, 7, 9, 172/26, 492, 521; 280/405 B, 446 R, 446 A

[56] References Cited

U.S. PATENT DOCUMENTS

| 2,616,350 | 11/1952 | Robinson et al. | 172/4 |
| 2,635,519 | 4/1953 | Cook | 172/521 X |
| 3,256,940 | 6/1966 | Ashfield | 172/9 |
| 3,750,757 | 8/1973 | Saetti | 172/9 |
| 4,176,721 | 12/1979 | Poggemiller et al. | 172/4 |

FOREIGN PATENT DOCUMENTS

| 821831 | 9/1969 | Canada | 172/413 |
| 1557863 | 10/1970 | Fed. Rep. of Germany | 172/4 |
| 684134 | 3/1965 | Italy | 172/9 |
| 40888 | 7/1958 | Poland | 172/4 |
| 242540 | 9/1969 | U.S.S.R. | 172/4.5 |

Primary Examiner—Richard T. Stouffer
Attorney, Agent, or Firm—Mason, Mason and Albright

[57] ABSTRACT

An agricultural tractor with a hitching or lifting device which carries a farm implement. A control mechanism is provided on the tractor for adjusting automatically the height of the hitching device to enable the implement to follow irregularities in the underlying ground. The control mechanism includes a sensing member which, in one embodiment (FIG. 1), comprises two wheels which may pivot together about a common axis, such pivoting causing adjustment of the hitching device. In another embodiment, independently pivotable wheels or a further ground engaging member such as a skid may be located ahead of or behind the ground engaging wheels of a tractor which, by connection to the control mechanisms cause the hitching device to adjust to the height of the underlying ground.

50 Claims, 6 Drawing Figures

VEHICLE WITH A LIFTING DEVICE RESPONSIVE TO GROUND IRREGULARITIES

SUMMARY OF THE INVENTION

This invention relates to a vehicle having a hitching device.

According to the present invention there is provided a vehicle having a hitching device for the attachment of machinery, control means being provided which is adapted to adjust the hitching device automatically in operation in response to unevenness of the ground over which the vehicle travels; at least two non-coaxial wheels are provided which are pivotable with respect to the rest of the vehicle about a common axis, and the wheels are interconnected by a frame, movement of which, with respect to the rest of the vehicle, results in adjustment of the hitching device.

For a better understanding of the present invention and to show how it may be carried into effect, reference will now be made, by way of example only, to the accompanying drawings, in which:

DESCRIPTION OF THE PREFERRED EMBODIMENTS

Figure 1:
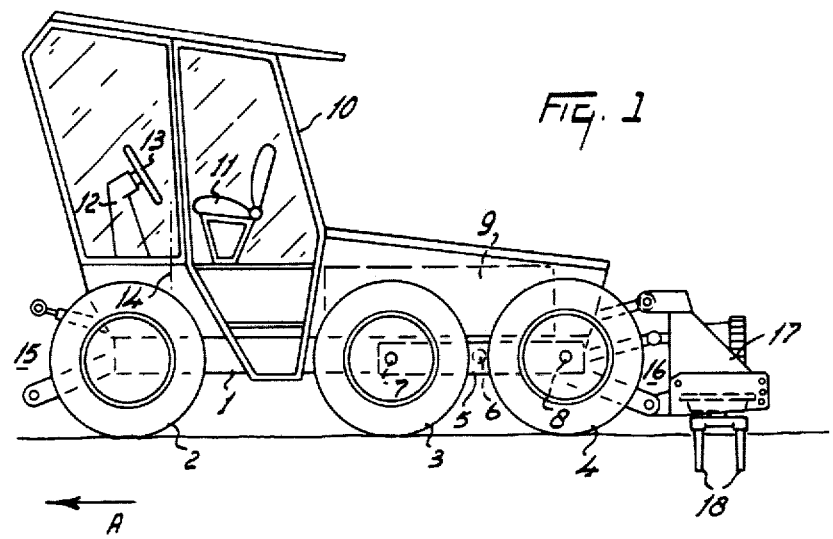
FIG. 1 is a side elevation of a tractor to which a machine is attached.

The tractor shown in FIG. 1 comprises a frame 1 and is supported by front wheels 2 and rear wheels 3 and 4 arranged on both sides of the frame. The leading rear wheel 3 and the trailing rear wheel 4 on the same side of the tractor are journalled in a wheel carrier 5 which in operation is substantially horizontal and lies in the direction of forward travel A. The wheel carrier 5 and the wheels 3 and 4 carried by it are pivotable in operation about a pivotal axis 6, which is horizontal and transverse of the direction A and is journalled in the frame 1. The wheel axle 7 of the leading rear wheel 3 and the wheel axle 8 of the trailing rear wheel 4 are journalled at the front and rear ends respectively of the wheel carrier 5. The pivotal axis 6, about which the wheel carrier 5 is freely pivotable with respect to the frame 1, is located approximately midway along the wheel carrier 5. This construction is provided on both sides of the tractor and is such that each set of rear wheels 3 and 4 on each side of the tractor together with the associated wheel carrier 5 is pivotable with respect to the frame 1 independently of the set of wheels 3 and 4 and wheel carrier 5 on the other side of the tractor.

A driving engine 9 is mounted on the frame 1 at generally the same position along the tractor as the wheels 3 and 4. A driver's cab 10 is provided in the region of the front wheels 2 and the interval between the wheels 2 and 3. In the cab there is a driver's seat 11 and a console 12 provided with a steering wheel 13 for controlling the steerable front wheels 2 and with other steering and control members of the tractor. The driver's seat 11 and the console 12 together with the steering and control members can turn as a whole about a substantially vertical pivotal axis 14 located between the console 12 and the seat 11, so that the assembly can be set in either of two positions offset from one another by 180°. In one of these positions the driver faces in the direction A and in the other position he faces in the opposite direction.

At the front the tractor has a three-point hitching device 15 and at the rear it has a three-point hitching device 16. In the example illustrated in FIG. 1, a rotary harrow 17 is attached to the rear three-point hitching device 16; the tines 18 of the harrow 17 penetrate the soil to a given depth. The harrow 17 is driven through a power take-off shaft 19 near the hitching device 16. Near the front hitching device 15 there is another power take-off shaft.

The rear wheels 3 and 4 on each side of the tractor can be driven by a driving shaft 20 (FIG. 2), which is coaxial with the pivotal axis 6. The driving shaft 20 is rotated by the driving engine 9 through a torque converter (not shown) and a differential gear. Each end of the driving shaft 20 is provided with a pinion located in the wheel carrier 5 concerned, this pinion being coupled via a gear train in the wheel carrier 5 with pinions coaxial with the wheel axles 7 and 8. All of the pinions are located inside the wheel carrier concerned and can turn together with the wheel axles 7 and 8 and with the wheel carrier 5 about the pivotal axis 6.

The pairs of rear wheels 3 and 4 on the two sides of the tractor frame are, therefore, all drivable and are capable of turning freely about the pivotal axis 6 in pairs independently of the set located on the other side.

Near the driving shaft 20, on the top of the carrier beam 5, there is a coupling arm 21 which is inclined inwardly from bottom to top away from its wheel carrier 5. Each of the two coupling arms 21 is rigidly secured at one end to its wheel carrier 5 and is movably coupled at the other end with a rod 22 which is integral with or pivotally coupled with a spool of a control valve 23, which is rigidly connected to the tractor frame near the wheel carrier 5.

An input duct 24 connects each control valve 23 with a hydraulic pump 25, which draws hydraulic fluid through a duct 26 from a fluid reservoir 27. The valve 23 also communicates directly with the reservoir 27 through a duct 28. The control valve 23 also communicates through a duct 29 with a working chamber of a hydraulic cylinder 30 containing piston 31 which is coupled by a piston rod 32 with a bell-crank lever 33. The lever 33 is connected by a lifting rod 34 to the lower arms 35 of the hitching device 16.

A set of the parts 21, 22, 23, 24, 28, and 29 to 35 is provided on each side of the tractor. The two sets of parts are, however, fed by a common pump 25. The parts 21, 22, 23, 24 to 32 together with the wheels 3, 4 and the wheel carrier 5 constitute a control means for the hitching device 16.

The hydraulic pump 25 is driven from the drive shaft 20 through a transmission (not shown) comprising, for example, a gear box having a fixed transmission ratio. The speed of the pump 25 is, therefore, proportional to the travelling speed of the tractor. Thus, when the tractor is stationary, there is no pressure in the duct 24. In this case the control valve 23 is fed by a second pump which is driven by the output shaft of the engine 9. For this purpose the duct 24 includes a valve (not shown), which automatically connects the control valve 23 with the second pump when the pump 25 delivers no pressure.

Figure 2:
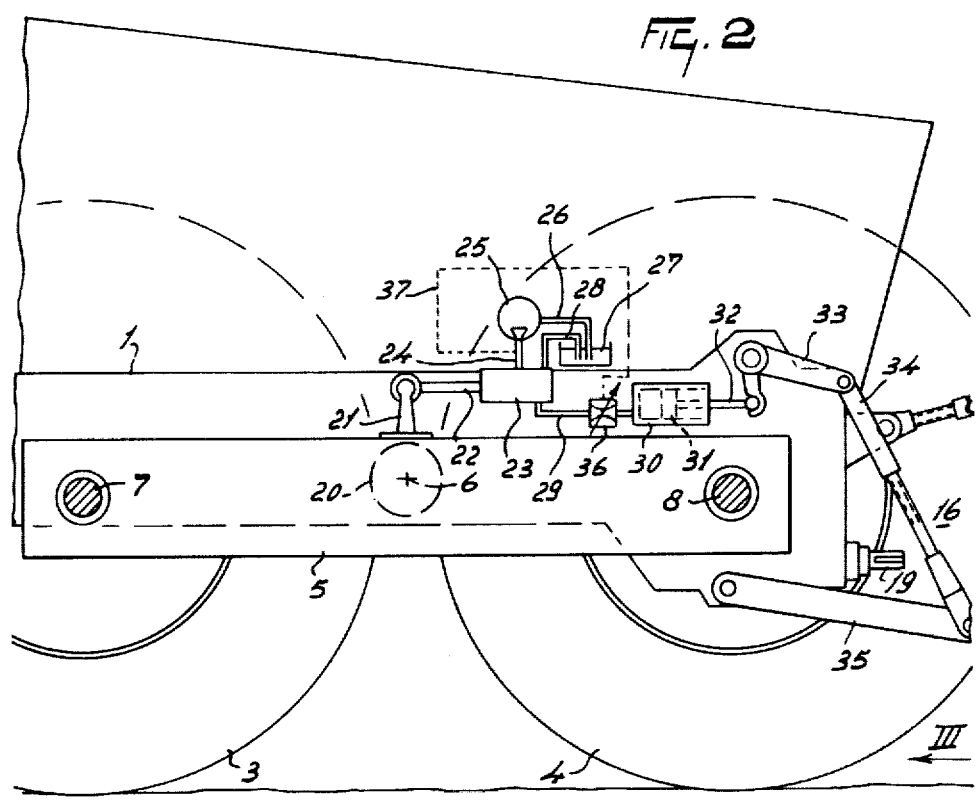
FIG. 2 is a side elevation of part of the tractor shown in FIG. 1 with a schematic representation of a height control device for the machine.
Figure 3:
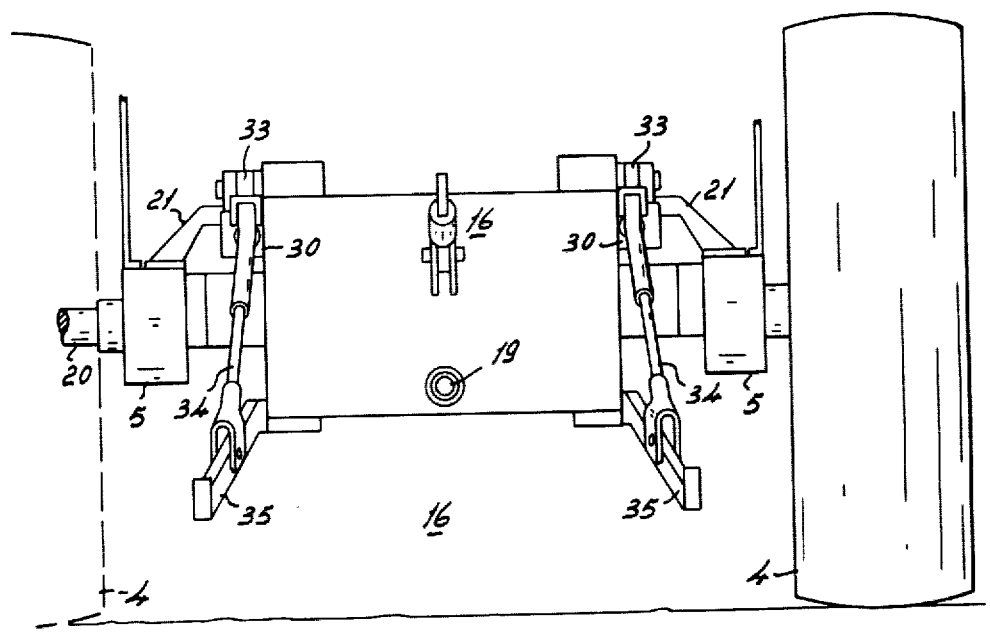
FIG. 3 is a view taken in the direction of the arrow III in FIG. 2.

The construction described above operates as follows: If, for example, the leading rear wheel 3 on one side of the tractor runs into a depression of the ground surface, the set of the two rear wheels 3 and 4 on that side of the tractor turns in a counter-clockwise direction as seen in FIG. 2. The coupling arm 21 then draws the rod 22 outwardly of the housing of the control valve 23 into a position in which hydraulic fluid is conducted towards the reservoir 27 from the working chamber of the cylinder 30 (fluid in this working chamber being pressurized by the weight of the machine) through the duct 29, the valve 23 and the duct 28. As a result the lower lifting arms 35 turn downwardly so that the attached machine 17 can follow the depression of the ground surface.

If the leading rear wheel 3 is raised by a bump in the ground or if the trailing rear wheel 4 runs through a depression in the ground, the set of these wheels together with the wheel carrier 5 turns in a clockwise direction so that the spool of the control valve 23 is moved inwardly of the control valve 23 into a position in which hydraulic fluid supplied by the pump 25 flows through the duct 24, the control valve 23 and the duct 29 into the cylinder 30 so that the lower lifting arm 35 turns upwardly and the attached machine 17 is lifted. This combination of directions of movement is particularly important when the magnitude of unevennesses of the ground, in the direction A, are approximately equal to or less than the distance between the front wheels 2 and the wheels 4. Therefore, the wheels 3 and 4 constitute sensing members of the sensing device.

This effect is obtained on each side of the tractor independently of the events on the other side of the tractor.

Between the occurrence of the upward and downward movements of the wheels 3 and 4 and the turning of the wheel carrier 5, and the moment at which the machine will respond to these movements there should be a lapse of time depending upon the instantaneous travelling speed of the tractor and upon the distance between the wheel responding to the unevenness and the machine. Since the output of the pump 25 depends upon the travelling speed, the rate of movement of the piston 31 with respect to the cylinder 20 also depends upon the travelling speed. The delay is adjusted as a function of the size of the machine 17 and the rate of flow is regulated by an adjustable throttle valve 36 in the duct 29. This throttle valve 36 can be set through a duct 37 indicated by broken lines in dependence upon the pressure delivered by the pump 25 and hence upon the travelling speed. In an alternative construction, the slide of the control valve 23 is designed so that if, for example, the wheel 3 moves downwards the pump 25 feeds fluid into the duct 29 and into the cylinder 30 so that the lifting arm 35 turns upwardly. Such a control is particularly advantageous when the magnitude of the unevennesses of the ground are approximately equal to or larger than the distance between the front wheels 2 and the wheels 4.

With the control arrangement described above, the hitching device is held at a predetermined height above the ground during operation so that the machine will follow unevennesses of the ground.

Figure 4:
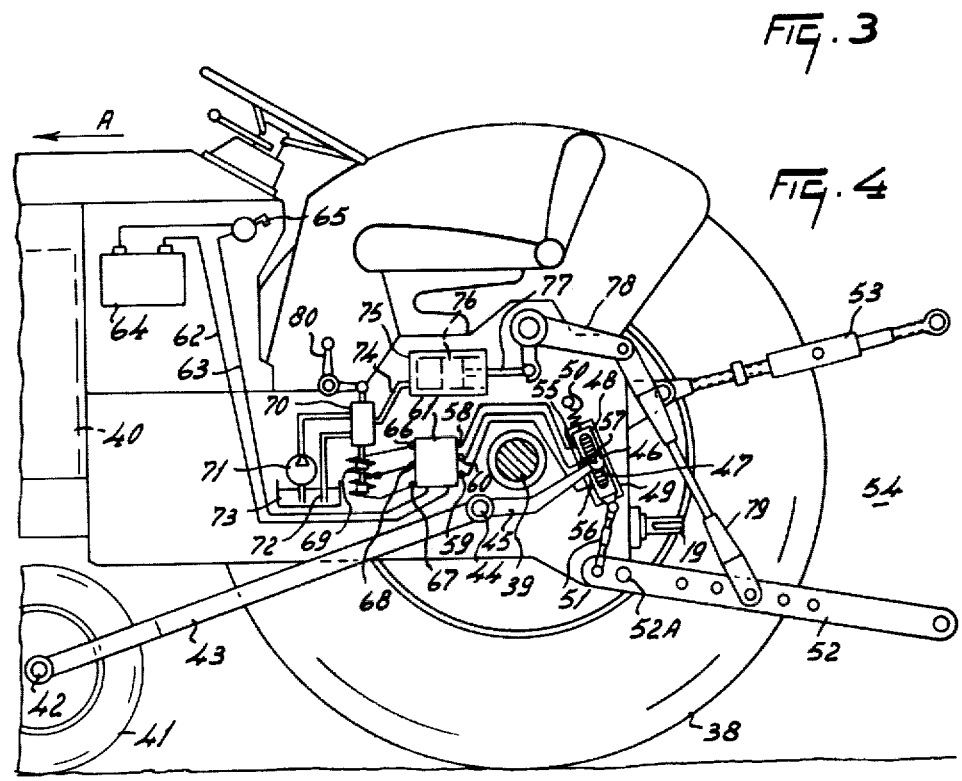
FIG. 4 is a side elevation of part of a second embodiment of a tractor.

In the embodiment of FIG. 4 the tractor comprises rear wheels 38 which can be driven by a driving shaft 39 which is connected by a differential gear and a torque converter with a driving engine 40. Between the front wheels (not shown in FIG. 4) and the rear wheels 38, and a short distance in front of the latter, there is a sensing member in the form of a sensing wheel 41 which is rotatable about a horizontal shaft 42 journalled in a carrier 43, and extending transversely of the direction of forward travel A. The carrier 43 is pivotable with respect to the rest of the tractor about a pivotal shaft 44 journalled in the tractor frame. The pivotal shaft 44 is located close to the driving shaft 39. The carrier 43 has an extension arm 45 on the side of the pivotal shaft 44 away from the wheel 41, the free end of this arm 45 carrying a shaft portion 46, which is upwardly movable in a slot 47 in a holder 48. The holder 48 itself is slidable up and down with respect to the tractor frame in a guide 49. A spring 50 acts between the top of the holder 48 and the tractor frame. The spring 50 tends to pull the holder 48 upwards. The bottom of the holder 48 is connected by a coupling piece 51 to a lower lifting arm 52 of a three-point hitching device 54 which also has a top lifting arm 53. Between the fastening point of the coupling piece 51 and the rear end of the lifting arm 52 there is a pivotal shaft 52A, about which the lifting arm 52 can turn with respect to the frame. Inside the holder 48 there is a potentiometer with two end contacts 55 and 56, which are fixed in position with respect to the holder 48. The shaft portion 46 located in the slot 47 is provided with a wiper 57, which is displaceable along the potentiometer and the holder dependent upon the position of the carrier 43 and the arm 45. The end contacts 55 and 56 and the wiper 57 are connected to inputs 58, 59, 60 of a power amplifier 61, which is connected by leads 62 and 63 to the battery 64 of the tractor. The current supply to the power amplifier 61 can be switched on and off by the driver from his seat by means of a switch 65. The current amplifier has outputs 66, 67 and 68 connected to the two end contacts and the central contact respectively of an electromagnetic two-way solenoid 69. Inside the solenoid there is a displaceable core to which a spool of a control valve 70 is connected. A hydraulic pump 71 is connected to the control valve 70 and a duct 72 connects the control valve with a fluid reservoir 73. The pump 71 draws fluid from the reservoir 73. The control valve 70 communicates through a duct 74 with a hydraulic cylinder 74 which contains a piston 76 connected with a piston rod 77 coupled with a bell-crank lever 78, which is connected by a lifting rod 79 to the lower lifting arm 52 at a location between the pivotal shaft 52A and the rear free end of the lifting arm 52. The spool of the control valve 70 can also be directly manually actuated by a lever 80 located near the driver. A machine is coupled with the hitching device 54. The pump 71 is driven by the driving shaft 39 so that the fluid delivery is again dependent upon the travelling speed, while the same precautions are taken as in the previous embodiment for operation when the tractor is stationary. The parts 41 to 45 constitute a sensing member which forms the control means together with the parts 46 to 51 and 55 to 75.

If during operation the tractor travels over uneven ground and the sensing wheel 41 runs, for example, into a depression in the ground, the carrier 43 and the arm 45 rigidly secured to it will turn about the pivotal shaft 44 in a counter-clockwise direction (FIG. 4). The shaft portion 46 and the wiper 57 connected to it will move upwardly in the slot 47 with respect to the holder 48 so that the electrical resistance between the contacts 55 and 57 will decrease and the resistance of the other branch (between the contacts 57 and 56) will increase. This resistance variation in the branches of the potentiometer is fed to the inputs 58 to 60 of the power amplifier 61 so that from the output terminals 66 to 68 of the amplifier 61 currents of different intensities flow through the two branches of the solenoid 69. As a result of the magnetic field variations in the solenoid 69 the core will move axially in the solenoid 69 so that the spool of the control valve 70 is displaced. This displacement places the ducts 74 and 72 in communication with one another and the fluid in the cylinder 75, pressurized by the weight of the machine attached to the hitching device 54, flows back through the ducts 74 and 72 into the reservoir 73. As a result, the machine will move downwardly with respect to the tractor to follow the depression of the ground.

If the sensing wheel 41 moves upwardly to pass over a bump in the ground, different currents will flow from the amplifier 61 through the two branches of the solenoid 69 owing to the downward movement of the wiper 57 with respect to the potentiometer so that the spool will move in the opposite direction. In this case, the spool is set so that the pump 71 can introduce hydraulic fluid through the duct 74 into the cylinder 75 as a result of which the lower arms 52 of the hitching device and hence the attached machine are raised to follow the bump. As in the first embodiment, the duct 74 may include an adjustable throttle valve 36, which is connected through a separate duct, analogous to the duct 37, with the outlet of the pump 71. Thus, as in the first embodiment, a delay may be incorporated which varies with the travelling speed of the tractor. The control valve shown in FIG. 4 may be used on both sides of the tractor, so that each control valve actuates one of the two lower lifting arms 52. The pump 71 can feed both of the control valves 70.

The control valve shown in FIG. 4 may also be employed in the case where the positions of the hitching device and of the attached machine vary with respect to the tractor, the position of the sensing wheel 41 remaining the same. If a lifting arm 52 moves downwards, for example, due to leakage of hydraulic fluid, the holder 48 is drawn upwards by the spring 50 past the shaft portion 46 and the wiper 57. This relative movement of the wiper with respect to the holder 58 is the same as that which occurs when the sensing wheel 41 runs over a bump in the ground, and the control means causes the lower lifting arms 52 to move upwardly until the resistance of the two branches of the potentiometer are again the same.

In both of the embodiments described above the control means described is designed so that when the wheel 3 or the sensing wheel 41 moves downwardly the hitching device and the attached machine also move downwardly, and vice versa. This control is appropriate when the length of the unevenness is generally smaller than the distance between the front wheels and the rear wheels. However, if the dimension of an unevenness is approximately equal to or larger than the distance between the front wheels and the rear wheels of the tractor, it may be advantageous to invert the control so that when the foremost rear wheel 3 or the sensing wheel 41 moves upwardly the control means, after a delay, causes the machine to move downwards, and vice versa. To achieve this change-over, the connection between the coupling piece 51 and the lifting arm 52 has to be moved to that it is located between the pivotal shaft 52A and the rear free end of the arm 52. Thus the tractor can be simply adapted to the nature of the ground to be covered.

The driver can actuate the hitching device using a lever 80 independently of the sensing device. This precaution may also be taken in the other embodiments.

Figure 5:
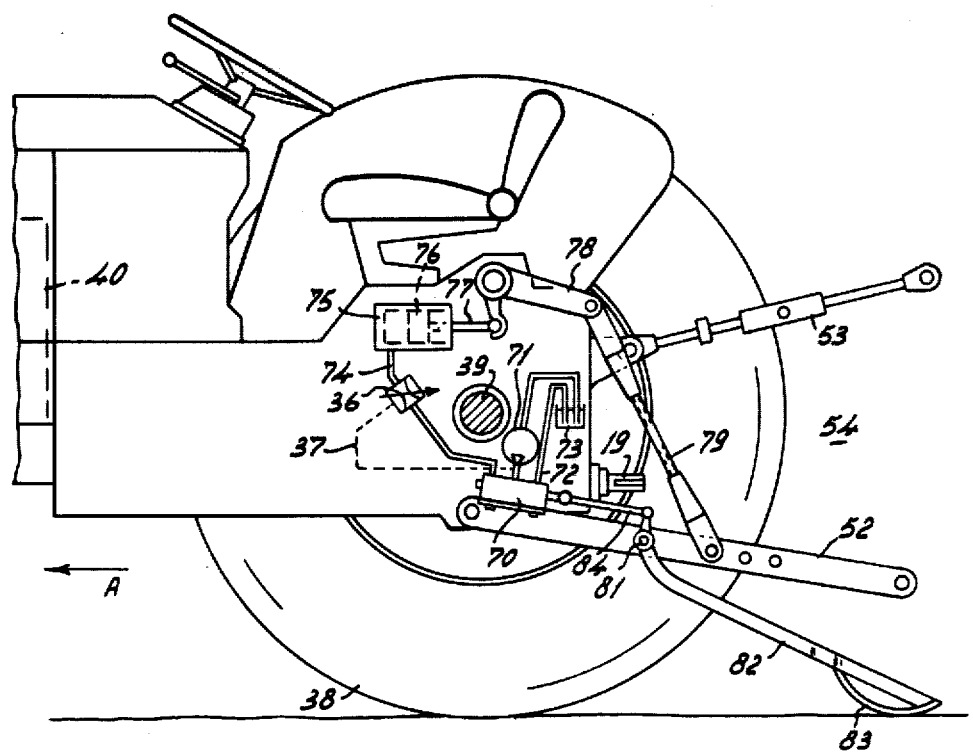
FIG. 5 is a side elevation of part of a third embodiment of a tractor.
Figure 6:
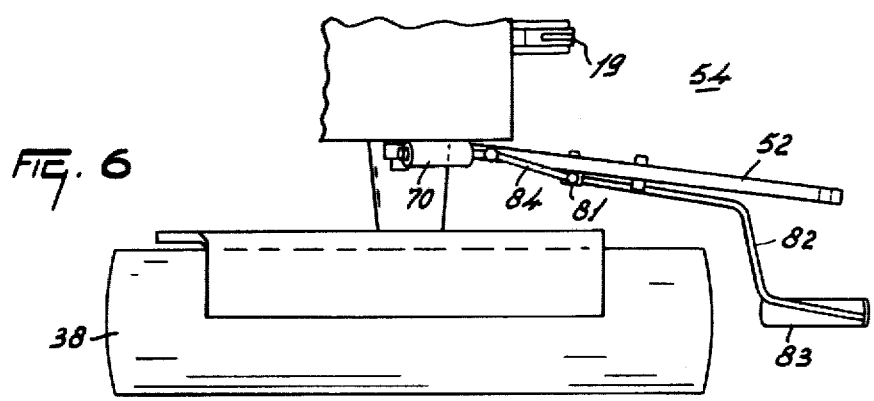
FIG. 6 is a plan view of part of the tractor of FIG. 5.

A third embodiment of a control means for a machine attached to a tractor is illustrated in FIGS. 5 and 6. The parts of the construction of FIGS. 5 and 6 correspond with parts shown in FIG. 4 are designated by the same reference numerals.

The lower lifting arms 52 are each provided with a pivotal shaft 81, about which is pivotable an arm 82 which slopes downwardly from front to rear and carries at its end a skid 83, which is held during operation in contact with the ground by its own weight and which slides along the ground surface. The arm 82 extends to the other side of the pivotal shaft 81 and is coupled at its free end, by a rod 84, with the spool of the control valve 70. The control valve 70 is rigidly secured to the lifting arm 52. The hydraulic pump 71 is, as before, driven through a transmission mechanism having a fixed transmission ratio by the driving shaft 39. When the tractor is stationary the same precaution as described for the first embodiment is taken.

The skid 83 may be replaced by a ground wheel. The skid 83 (or the ground wheel) is arranged at a short distance behind the wheel 38.

The arm 82 is bent outwardly at a position in front of the end of the lower lifting arm 52 and then bent back to extend substantially parallel to the lifting arm 52, so that the skid 83 or the ground wheel does not hinder the attachment of the machine to the hitching device.

The skid 83 thus follows unevennesses of the ground at a position located close to the machine, yet is sensitive to unevennesses of the ground over which passes the adjacent rear wheel 38. Owing to the distance between the front and rear wheels of the tractor the position of the arm 82 is substantially insensitive to unevennesses of the ground followed by the front wheels.

If the rear wheel 38 runs up a rise in the ground, the arm 82 will turn with respect to the lifting arm 52 about the pivotal shaft 81 in a clockwise direction. The rod 84 displaces the spool of the control valve 70 so that hydraulic fluid flows from the pump 71 through the duct 74 into the cylinder 75 to move the piston 76 outwardly, so raising lifting arm 52. The adjusted delay is such that the machine is lifted as it reaches the rise. This delay may be obtained by the adjustable throttle valve 36 shown in FIG. 2, the adjustment of which is performed through the duct 37 communicating with the pressure side of the pump 71. At a higher travelling speed the pump pressure is higher so that the throttling effect of the valve 36 is decreased and the piston will respond more quickly than with a lower travelling speed. When the skid 83 arrives at the rise, a reverse control is performed which is transmitted with a time lag to the lifting arm 52. If the rear wheel 38 runs through a depression in the ground, the arm 82 turns upwardly. This connects the duct 74 with the reservoir 73 so that the lifting arm 52 turns downwardly after a delay, under the action of the weight of the machine, to follow the depression of the ground.

The spool of the control valve 70 may, as an alternative, be designed so that the movements of the lifting arm 52 as a result of the movements of the skid 83 are performed in the reverse senses. In this case, when a rear wheel 38 runs up a rise in the ground (so that the arm 82 turns downwards with respect to the arm 52) the lifting arm 52 will also turn downwards. This structure of the control valve is appropriate when the length of the unevenness of the ground is of the same general order of magnitude as the distance between the front and rear wheels of the tractor, or is larger than that distance. With this setting the skid 83 will hold the hitching device during operation at a predetermined level above the ground. If the lower lifting arm 52 turns downwards unintentionally for some reason or other (for example, due to leakage of fluid), the skid 83 turns upwardly with respect to the lifting arm 52 after which the control valve 70 rigidly secured to the lifting arm 52 will cause the lifting arm to turn upwards again.

As in the previous embodiments, the control valve may be a double device in which each lifting arm 52 is connected with one of the control means 36, 37, 70 to 75, 82 to 84. The pump 71 can again feed both control valves.

The sensing wheels 41 and the other parts 46 to 51, 55 to 75 of the control means shown in FIG. 4 and arranged on both sides of the tractor or the skid 83 and the parts 36, 37, 70 to 75 shown in FIG. 5 and also arranged on both sides of the tractor for controlling the lifting arms 52 separately may also be employed in the embodiment of the tractor shown in FIG. 1 in conjunction with the hitching device 15, when the tractor is travelling backwards, the wheel 41 being then in front of the wheel 2 or the skid 83 being behind the wheel 2, with respect to this backwards travel direction.

Although various features of the tractors as described and illustrated in the drawings, will be forth in the following claims as inventive features, it is to be understood that the invention is not necessarily limited to these features and encompasses all novel features described both individually and in various combinations.

Having described our invention, what we claim as new and desire to secure by Letters Patent of the United States is:

1. A vehicle comprising an agricultural tractor having a hitching device for the attachment of agricultural machinery and implements, hydraulic control means being provided which is adapted to adjust said hitching device automatically in operation in response to unevenness of the ground over which the vehicle travels, at least two non-coaxial wheels being provided which are pivotable with respect to the rest of the vehicle about a common substantially horizontal transverse axis between the axes of rotation of said wheels, said wheels being interconnected by a frame, movement of which about said axis in response to ground unevenness, with respect to the rest of the vehicle, causes actuation of said control means for adjustment of said hitching device.

2. A vehicle as claimed in claim 1, in which said hitching device comprises two arms, each of which is coupled with a separate said control means, said two arms being movable upwardly and downwardly independently of one another during operation.

3. A vehicle as claimed in claim 2, in which each of said arms is provided with a sensing member.

4. A vehicle as claimed in claim 2, in which the said non-coaxial wheels constitute sensing members of said control means.

5. A vehicle as claimed in claim 4, in which at least one of said sensing members actuates a portion of said control means including control member.

6. A vehicle as claimed in claim 5, in which said control member comprises a hydraulic control valve which is adapted to be adjusted by said sensing member.

7. A vehicle as claimed in claim 6, said vehicle further comprising a hydraulic pump in which said control valve communicates with said hydraulic pump.

8. A vehicle as claimed in claim 7, in which said pump is connected to be driven at a speed proportional to the travel speed of the vehicle.

9. A vehicle as claimed in claim 8, in which said pump is driven by the wheel axle of a drivable wheel of the vehicle.

10. A vehicle as claimed in claim 9, in which said control valve communicates with a fluid reservoir.

11. A vehicle as claimed in claim 6, in which said control valve communicates with a hydraulic cylinder by means of which said hitching device can be adjusted.

12. A vehicle as claimed in claim 6, in which there is a mechanical connection between said control valve and each said sensing member.

13. A vehicle as claimed in claim 6, in which there is an electrical connection between said control valve and each said sensing member.

14. A vehicle as claimed in claim 13, in which each said sensing member is connected to displace a wiper of a potentiometer.

15. A vehicle as claimed in claim 14, in which the currents flowing through the two branches of said potentiometer are amplified by a current amplifier.

16. A vehicle as claimed in claim 15, in which said amplified electrical currents are passed through the branches of a two-way solenoid.

17. A vehicle as claimed in claim 16, in which a core which is movable in the two-way solenoid is connected to actuate the control valve.

18. A vehicle as claimed in claim 14, in which said control means is responsive to the position of said hitching device independently of said sensing members.

19. A vehicle as claimed in claim 18, in which said hitching device is coupled with said potentiometer.

20. A vehicle as claimed in claim 19, in which said potentiometer is displaceable by said hitching device with respect to the rest of the vehicle.

21. A vehicle as claimed in claim 4, in which said control means is adapted to provide a time delay between the movement of said sensing members and the corresponding response of said hitching device.

22. A vehicle as claimed in claim 21, in which the delay is caused by a throttle valve.

23. A vehicle as claimed in claim 22, comprising a hydraulic cylinder for adjusting said hitching device in which said throttle valve is provided in a line connecting said control valve with said cylinder.

24. A vehicle as claimed in claim 23, in which said throttle valve is adjustable.

25. A vehicle as claimed in claim 21, in which said time delay varies with the travel speed of the vehicle.

26. A vehicle as claimed in claim 1 which has at least three wheels including said two wheels arranged one behind the other, with respect to the intended direction of forward travel, one of said wheels being pivotable with respect to said hitching device to adjust said hitching device.

27. A vehicle as claimed in claim 1, wherein said noncoaxial wheels constitute sensing members of said control means and in which the position of said hitching device with respect to the rest of the vehicle is controlled by said control means.

28. A vehicle as claimed in claim 27, in which said sensing members are pivotally connected with part of said hitching device.

29. A vehicle as claimed in claim 28, in which said control valve is rigidly connected with said part of said hitching device.

30. An agricultural tractor having a hitching device for the attachment of agricultural implements, said hitching device comprising two arms, a control means being provided for each arm, each control means being adapted to adjust each arm independently automatically in operation in response to unevenness of the ground over which the vehicle travels, at least two sensing members being provided on each side of the longitudinal axis of said vehicle which are movable vertically with respect to the rest of the vehicle, said sensing members each being interconnected to the rest of the vehicle by frame means, movement of which, with the respect to the vehicle, results in the adjustment of a corresponding arm of said hitching device, whereby said two arms are movable upwardly and downwardly independent of one another during operations of said tractor, each said control means being adapted to provide a time delay between the movement of said sensing members and the corresponding response of the corresponding said arm, said time delay being produced by a throttle valve provided in each said control means, a hydraulic cylinder for each said arm for adjusting said arm, each said control means comprising a hydraulic control valve, each said throttle valve being provided in a line connecting each said control valve with its corresponding said cylinder, each said throttle valve being adjustable as a function of the pressure of hydraulic fluid delivered by a hydraulic pump which is included in each said control means connected to a corresponding said cylinder.

31. A vehicle as claimed in claim 30, in which said sensing members are each provided near a ground wheel of the vehicle, such ground wheel being adjacent said hitching device, said sensing member leading such ground wheel, with respect to the normal intended direction of forward travel of the vehicle.

32. A vehicle as claimed in claim 31, in which each said sensing member is a wheel.

33. A vehicle as claimed in claim 31, in which each said sensing member is a skid.

34. A vehicle as claimed in claim 30 in which said sensing members are each provided near a ground wheel of the vehicle, such ground wheel being adjacent said hitching device, said sensing member trailing such ground wheel, with respect to the normal intended direction of forward travel of the vehicle.

35. A vehicle as claimed in claim 34, in which each said sensing member is in contact with the ground and is pivotable with respect to said hitching device.

36. A vehicle as claimed in claim 30, in which said control means is adapted whereby upward movement of said sensing members causes upward movement of said hitching device and vice versa.

37. A vehicle as claimed in claim 30, in which said control means is adapted whereby upward movement of said sensing members causes downward movement of said hitching device and vice versa.

38. A vehicle as claimed in the preceding claim 30 in which said control means is adapted to be manually operable by a driver of the vehicle.

39. A vehicle comprising an agricultural tractor having a hitching device for the attachment of agricultural implements, control means being provided which is adapted to adjust said hitching device automatically in operation in response to unevenness of the ground over which the vehicle travels, at least two wheels being provided which are movable vertically with respect to the rest of the vehicle, said wheels each being pivotally interconnected to the rest of the vehicle by frame means, said pivotal interconnection being for each of said wheels horizontal and transverse to the vehicle's longitudinal axis and between the axes of rotation of said wheels, movement of said frame means about said pivotal interconnection with respect to the rest of the vehicle, causing adjustment of said hitching device, said hitching device comprising two arms, each of which is coupled with a separate said control means, said two arms being movable upwardly and downwardly independently of one another during operation.

40. A vehicle as claimed in claim 39, wherein said wheels constitute a sensing member and each of said arms is provided with one of said sensing members.

41. A vehicle as claimed in claim 39, wherein said wheels comprise sensing members of said control means.

42. A vehicle as claimed in claim 41, wherein said control means is adapted to provide time delay between the movement of said sensing member and the corresponding response of said hitching device.

43. A vehicle as claimed in claim 42, wherein the time delay is caused by a throttle valve provided in said control means.

44. A vehicle as claimed in claim 43, comprising a hydraulic cylinder for adjusting said hitching device wherein said control means comprises a hydraulic control valve and said throttle valve is provided in a line connecting said control valve with said cylinder.

45. A vehicle as claimed in claim 44, wherein said throttle valve is adjustable.

46. A vehicle having a hitching device for the attachment of machinery, control means being provided which is adapted to adjust said hitching device automatically in operation in response to unevenness of the ground of which the vehicle travels, at least two non-coaxial wheels being provided which are pivotable with the respect to the rest of the vehicle about a common axis, said wheels being interconnected by a frame, movement of which, with respect to the rest of the vehicle, results in adjustment of said hitching device, said hitching device comprising two arms, each of said arms being coupled with a separate said control means, said two arms being movable upwardly and downwardly independently of one another during operation, said non-coaxial wheels constituting sensing members of said control means, said control means being adapted to provide a time delay which is caused by a throttle valve between the movement of said sensing member and the corresponding response of said hitching device, a hydraulic cylinder for adjusting said hitching device, a hydraulic pump connected to deliver pressure fluid to said cylinder as a function of the vehicle's speed, said throttle valve being provided in a line connecting said control valve with said cylinder, said throttle valve being adjustable as a function of pressure fluid delivered by said pump connected to said cylinder.

47. A vehicle having a hitching device for the attachment of machinery, control means being provided which is adapted to adjust said hitching device automatically in operation and response to unevenness of the ground over which the vehicle travels, a hydraulic pump included in said control means, at least two wheels being provided which are movable vertically with respect to the rest of the vehicle, said wheels being interconnected to the rest of the vehicle by frame means, movement of which, with respect to the rest of the vehicle, results in adjustment of said hitching device, said hitching device comprising two arms, each of which is coupled with a separate said control means, said two arms being movable upwardly and downwardly independently of one another during operation, said wheels comprising sensing members of said control means, said control means being adapted to provide time delay between the movement of said sensing member and the corresponding response of said hitching device by a throttle valve provided in said control means, a hydraulic cylinder for adjusting said hitching device wherein said control means comprises a hydraulic control valve and said throttle valve is provided in a line connecting said control valve with said cylinder, said throttle valve being adjustable as a function of the pressure fluid delivered by said pump included in said control means connected to said cylinder.

48. An agricultural tractor having a hitching device for the attachment of implements, hydraulic control means comprising a hydraulic cylinder and a control valve being provided which is adapted to adjust said hitching device automatically in operation in response to unevenness of the ground over which it travels by said cylinder, at least one sensing member being provided for sensing the occurrence of said unevenness, said sensing member actuating said control valve, a hydraulic pump for pressurizing at least said control means at a pressure having a relationship to the tractor's velocity, a throttle valve in a line provided between said control valve and said hydraulic cylinder, said throttle valve being adjustable as a function of the pressure of the hydraulic fluid pressurizing said control means.

49. An agricultural tractor in accordance with claim 48, wherein the fluid pressure delivered by said hydraulic pump to said control means is proportional to the tractor's velocity.

50. An agricultural vehicle having a hitching device for attachment of agricultural implements, control means being provided which is adapted to adjust said hitching device automatically in operation in response to unevenness of the ground over which the vehicle travels, at least two non-coaxial wheels being provided which are pivotable with respect to the rest of the vehicle about a common axis, said wheels being interconnected by said frame, movement of which with respect to the rest of the vehicle, results in adjustment of said hitching device, said hitching device comprising two arms, each of said arms being coupled with said control means, said two arms being movable upwardly and downwardly during operations of the tractor, said non-coaxial wheels constituting sensing members of said control means, a hydraulic cylinder for adjusting said hitching device, a line connecting said control valve with said hydraulic cylinder, a throttle valve in said line, said control means being adapted to provide a time delay between movement of said sensing member and the corresponding response of said hitching device which is caused by said throttle valve, said throttle valve being adjustable as a function of a pressure of hydraulic fluid delivered by a hydraulic pump included in said control means connected to said cylinder.

* * * * *